Jan. 9, 1951
L. J. ANGUS
2,537,732
CARRIER FOR PERFORATED RECORD CARDS
Filed Feb. 18, 1948
2 Sheets-Sheet 1
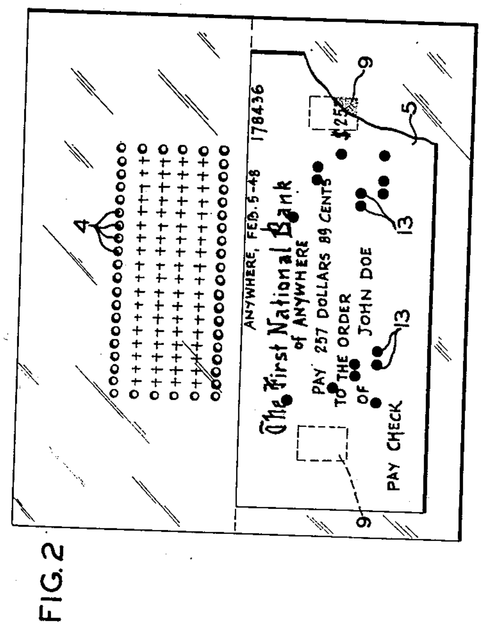
FIG. 2
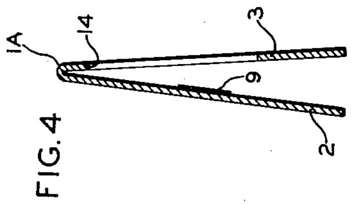
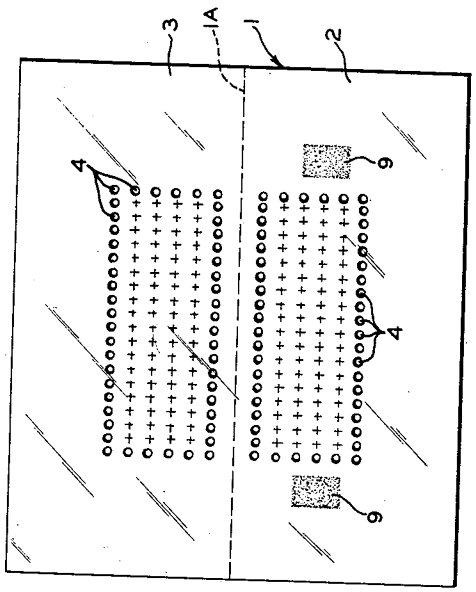
FIG. 1
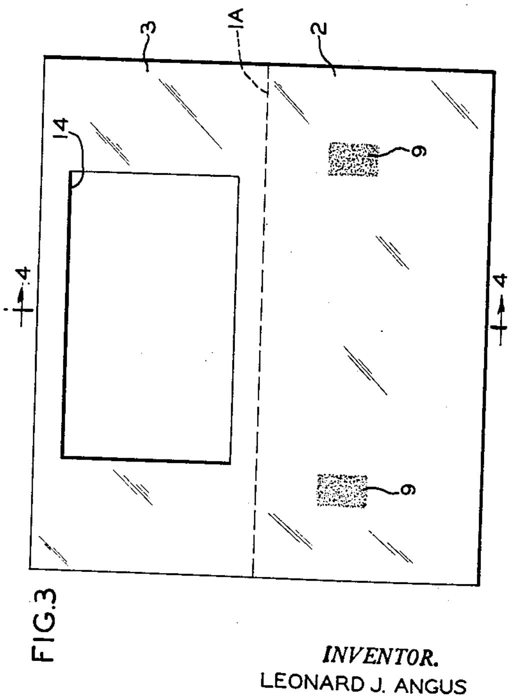
FIG. 3
*INVENTOR.*
LEONARD J. ANGUS
*BY*
ATTORNEY Jan. 9, 1951 L. J. ANGUS 2,537,732

CARRIER FOR PERFORATED RECORD CARDS

Filed Feb. 18, 1948 2 Sheets-Sheet 2

*INVENTOR.*
LEONARD J. ANGUS

*BY*

ATTORNEY

Patented Jan. 9, 1951

2,537,732

UNITED STATES PATENT OFFICE 2,537,732

CARRIER FOR PERFORATED RECORD CARDS

Leonard James Angus, Manhasset, N. Y., assignor to Remington Rand Inc., New York, N. Y., a corporation of Delaware Application February 18, 1948, Serial No. 9,138

13 Claims. (Cl. 235—61.12)

This invention relates to the method of and means for preparing paper documents, such as checks, bills, and the like, for use in card operated business machines such as tabulators and sorters, etc., and primarily to a form of container for said documents and the method of its use.

The present embodiment as shown and described is for use in a well known form of card controlled statistical machines such as those tabulators, sorters, and the like, and which have been described in various patents, for example, 1,315,370 to W. W. Lasker, 1,967,617 to C. D. Lake, and 2,044,119 to W. W. Lasker. However, while the invention herein shown is applicable for use with the above type machine, it will be understood that the same may be used with other types of statistical machines without departing from the scope of the invention.

It has been a recognized problem that prior to this invention, the handling of documents, such as cancelled checks, deposit slips, and similar papers for the purpose of sorting, tabulating, and analysis or reference, has been a tiresome task for persons in banks and similar places of business. This is especially true when the documents handled are of varying thicknesses or of different sizes, or when they have been folded, torn, or multilated in any other manner, which prevented them from being fed through a record controlled machine. This resulted in the necessity of punching a corresponding card in each case when it was necessary to perform various machine operations. This often resulted in errors in punching, which obviously required that the resultant card be checked with the original document. To overcome this the original documents, such as bills and checks, were made out on perforated cards to permit their use in the various statistical machines. However, although the use of card checks resulted in much less expense in handling, and also gave a greater degree of accuracy, this practice has been attended with very serious difficulties. It is well known that the punched cards are fed seriatim from a card magazine through an opening or throat, which, for a fraction only of its length, is narrowed to a width which permits the passage of but one card at a time. It is obvious, therefore, that the portion of the card that is to pass through the throat must not be marred. The marring of the card may be caused by folding or mutilation in handling as the case may be, leaving the card useless.

It has been found that if a container of some stiff material, having the dimensions of a normal record card, is provided in which documents of varying sizes and thicknesses may be fastened, the document may be easily handled in a card operated business machine.

The principal object of this invention, therefore, is to provide a container which will conveniently handle paper documents of varying sizes or thicknesses for passage through business machines, such as punches, sorters, tabulators, and the like.

A further object is to provide containers having the dimensions of a punched card to facilitate the handling of checks and documents of different sizes in a card operated machine.

Another object is to provide a container for a paper document which permits the entering of data carried by the document in the form of perforations for controlling a card operated business machine.

A still further object is to provide a means for fastening a document in a container for use in a card operated business machine.

Other objects and structural details of the invention will be apparent from the following description when read in connection with the accompanying drawings, wherein Fig. 1 shows the preferred form of container in opened condition;

Fig. 2 shows a document in place in an open container;

Fig. 3 shows a modified form of the invention wherein a window is provided;

Fig. 4 is a cross section taken along line 4—4 of Fig. 3 with the container folded;

Figure 7:
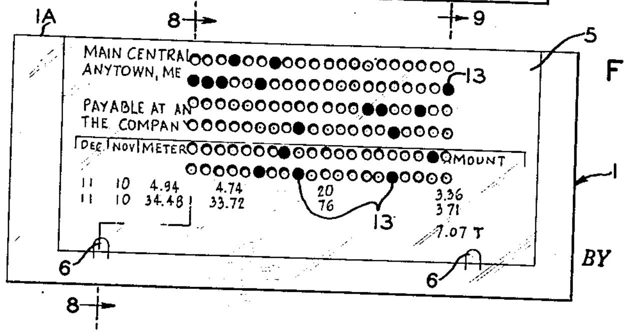
Fig. 7 shows the container of Figs. 5 and 6 folded.

One form of the invention is illustrated in the accompanying drawings wherein a container 1 (Fig. 1) is preferably formed from a sheet of relatively stiff transparent material such as pyroxylin, Plexiglas and the like. Thus the information to be punched from the checks, such as the date, account number, etc., can readily be seen by the operator. The container 1 is centrally folded upon itself at 1A to provide two leaves 2, 3 which are then perforated with a plurality of spaced apart perforations 4 corresponding to the columnar index positions of the well known Powers card. The container 1 as shown in Fig. 7 is the same shape and size as that of the well known statistical card shown in patent to W. W. Lasker, 1,780,621, issued November 4, 1930.

Another form of the invention is shown in Figs. 3 and 4, wherein the material used does not need to be transparent. Leaf 3 of the container 1 is provided with a cut-out 14, which arrangement does not necessitate the pre-punching of the leaf 3. The leaf 3 is perforated only when it is desired to transfer information from a check. The cut-out 14 may be of any suitable size so that the information to be punched from the checks, such as the date, account number, etc., may readily be seen by the operator.

Two methods of holding the checks 5 in the container (Figs. 2, 6, 7, 8) are hereinafter described, but any one of numerous methods can be employed without departing from the present invention.

It is not important how the check is held in the container, but it is important that it be held firmly to prevent movement after having been punched, thus facilitating accurate sensing of the perforations in said check.

Figure 5:
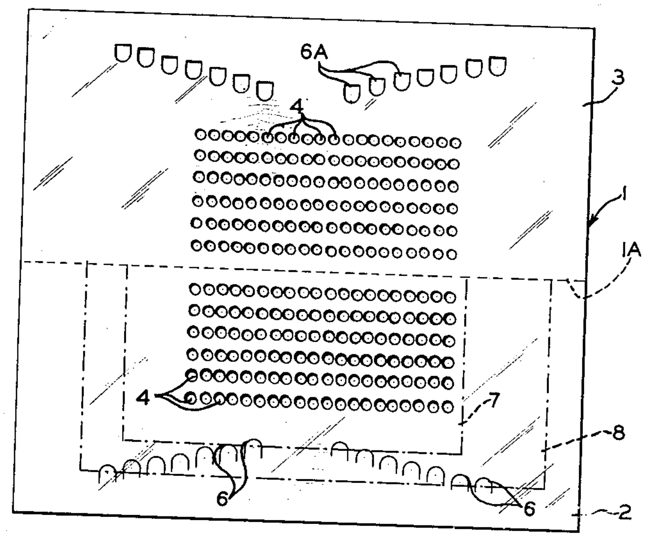
Fig. 5 shows a further modified form in open condition wherein notches are used for folding the document.

One method of holding the check 5 in the container 1 during a punching or sensing operation is shown in Fig. 5, wherein the leaf 2 of said container 1 is provided with a plurality of flaps or notches 6 punched in pairs, each pair being spaced a different increment from the fold 1A. One edge of the check is positioned against the fold 1A and the other edge is then positioned under the pairs of flaps 6 which will hold the check in close proximity and parallel to the fold.

Figure 8:
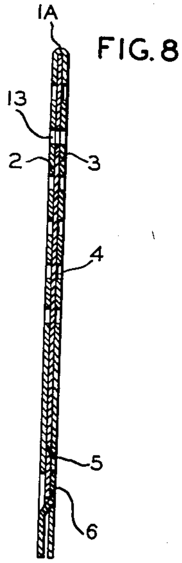
Fig. 8 is a cross section taken along line 8—8 of Fig. 7, showing the alignment of the perforations in the document and the container.
Figure 6:
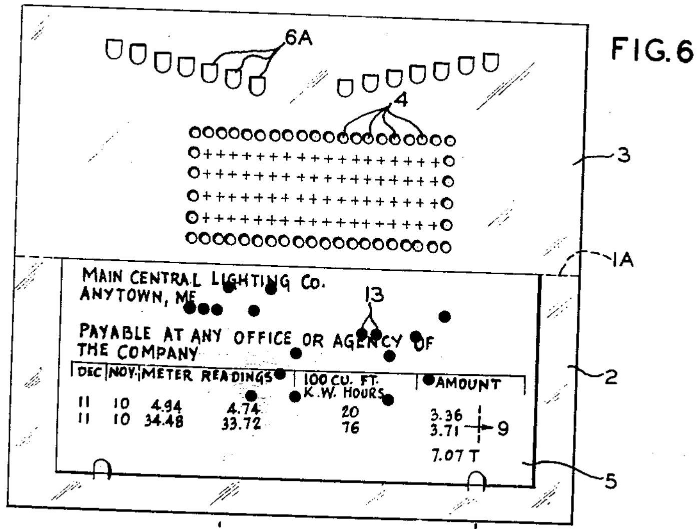
Fig. 6 is similar to Fig. 5 showing a document in position.
Figure 9:
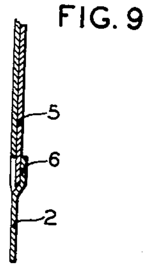
Fig. 9 is a cross section taken along line 9—9 of Fig. 7, showing the notch flap holding the document.

Cut-outs 6A in leaf 3 are provided to accommodate any of the flaps 6 in use, as shown in Fig. 8. This arrangement facilitates insertion of checks that vary in size, as indicated with dot and dash lines at 7 and 8 of Fig. 5.

The preferred method of holding the check 5 in the container 1 during the punching or sensing operation is shown in Figs. 1 and 2, wherein the leaf 2 is provided with two spots 9 of pressure sensitive transparent non-drying adhesive of chlorinated rubber with plasticizer, similar to that disclosed in Patent 2,164,360, July 4, 1939, to Clauss Burkart Strauch. As can be readily understood, after the check is placed in the container and pressure applied to the spots 9, the check will be held firmly until it is desired to remove it.

After each check 5 is placed between the leaves 2 and 3 of container 1 and held there by some such means as those mentioned above, the container 1 may be run through a punch where the desired information, such as account number, date, etc., is taken off the check, and entered in the check by coded perforations 13 (Figs. 2, 7, 6) similar to conventional punched cards such as that disclosed in the above Patent 1,780,621. The coded perforations are in alignment with the prepunched perforations 4 in the container, thus permitting sensing of the card. After the check is punched with all the desired information the containers can be readily handled in sorters, tabulators, and like business machines. Thus the handling of checks through these machines is facilitated, since each document handled is of exactly the same size due to its insertion in the container. Each document remains in its container until all desired operations are completed, at which time the documents may be removed from the containers and the containers used again.

What I claim as new, and desire to secure by Letters Patent, is:

1. A folder for use in feeding a paper document having written data thereon through a card controlled statistical machine comprising a main body portion folded upon itself, one leaf of which is provided with pairs of notches spaced at different increments from said fold for holding said document therein, the other leaf being provided with an aperture to facilitate the reading of said written data.

2. A folder for preparing paper documents for use in controlling card operated statistical machines comprising a sheet of relatively stiff material folded upon itself, the leaves of said folder being provided with a plurality of perforations forming columnar index positions, and means for holding a document between said leaves whereby perforated data may be entered in said document in alignment with said index positions.

3. A folder for preparing paper documents for use in controlling card operated statistical machines comprising a sheet of relatively stiff transparent material folded upon itself, the leaves of said folder being provided with a plurality of perforations forming columnar index positions, and means for holding a document between said leaves whereby perforated data may be entered in said document in alignment with said index positions.

4. A folder for preparing paper documents for use in controlling card operated statistical machines comprising a main body portion centrally folded upon itself, the leaves of said folder having therein a plurality of spaced apart perforations forming columnar index positions, one of said leaves being provided with means for holding said document while being perforated with data, said perforations being in alignment with said index positions.

5. A folder for preparing paper documents for use in controlling card operated statistical machines comprising a main body portion centrally folded upon itself, the leaves of said folder having therein a plurality of spaced apart perforations forming columnar index positions, one of said leaves being provided with spots of pressure sensitive adhesive material for holding said document while being perforated with data, said perforations being in alignment with said index positions.

6. A folder for preparing paper documents for use in controlling card operated statistical machines comprising a main body portion centrally folded upon itself, the leaves of said folder having therein a plurality of spaced apart perforations forming columnar index positions, one of said leaves being provided with notches for holding said document while being perforated with data, said perforations being in alignment with said index positions.

7. The method of preparing a document for controlling the operation of card operated statistical machines which consists in affixing said document in a container having adhesive means thereon and perforating data through said container and document.

8. The method of preparing a document with written data thereon which data is to be converted into perforations for controlling card operated statistical machines which consists in placing said document in a folder of relatively stiff transparent material pre-punched with a full complement of perforations forming columnar index positions, and affixing said document in said container and perforating said document in accordance with said written data, and in alignment with said index positions.

9. The method of preparing documents of variable dimensions for use in controlling card operated statistical machines which consists in placing a document in a container of uniform size pre-punched with a full complement of index perforations in columnar relation, and affixing said document in said container and perforating through certain of said pre-perforations to enter perforated data in said document in alignment with said index perforations.

10. The method of preparing documents of variable dimensions for use in controlling card operated statistical machines which consists in placing a document in a transparent container of stiff material and uniform size pre-punched with a full complement of index perforations in columnar relation, and affixing said document in said container and perforating through certain of said pre-perforations to enter perforated data in said document in alignment with said index perforations.

11. The method of preparing documents of variable dimensions whereby said documents may be fed through a card operated statistical machine for controlling said machine which consists in placing a document in a container of uniform size pre-punched with a full complement of index perforations in columnar relation, said perforations being in alignment with perforations entered in said document, and affixing said document in said container.

12. The method of preparing documents which may be fed through a card operated statistical machine for controlling said machine which consists in placing a document in a container pre-punched with a full complement of index perforations in columnar relation, said perforations being in alignment with perforations entered in said document, and a pressure sensitive material in said folder for holding said document.

13. The method of preparing documents which may be fed through a card operated statistical machine for controlling said machine which consists in placing a document in a container pre-punched with a full complement of index perforations in columnar relation, said perforations being in alignment with perforations entered in said document, and notches in said folder for holding said document.

LEONARD JAMES ANGUS.

REFERENCES CITED

The following references are of record in the file of this patent:

UNITED STATES PATENTS

| Number | Name | Date |
|---|---|---|
| 1,584,995 | Saltzman | May 18, 1926 |
| 2,291,173 | Simpson | July 28, 1942 |